(12) United States Patent
Lesnick

(10) Patent No.: US 12,625,465 B2
(45) Date of Patent: May 12, 2026

(54) CONTROLLING SPATIAL COHERENCE FOR HOLOGRAPHY

(71) Applicant: Hot Pixel Holographics LLC, Alexandria, VA (US)

(72) Inventor: Alexander John Michael Lesnick, Ashburn, VA (US)

(73) Assignee: Hot Pixel Holographics LLC, Alexandria, VA (US)

( * ) Notice: Subject to any disclaimer, the term of this patent is extended or adjusted under 35 U.S.C. 154(b) by 263 days.

(21) Appl. No.: 18/341,676

(22) Filed: Jun. 26, 2023

(65) Prior Publication Data

US 2024/0427287 A1     Dec. 26, 2024

(51) Int. Cl.
*G03H 1/04* (2006.01)

(52) U.S. Cl.
CPC ......... *G03H 1/0402* (2013.01); *G03H 1/0465* (2013.01); *G03H 2223/14* (2013.01); *G03H 2223/16* (2013.01); *G03H 2260/12* (2013.01); *G03H 2260/16* (2013.01)

(58) Field of Classification Search
CPC ............... G03H 1/0402; G03H 1/0465; G03H 2223/14; G03H 2223/16; G03H 2001/266
See application file for complete search history.

(56) References Cited

U.S. PATENT DOCUMENTS

2014/0168734 A1*  6/2014  Dell'Eva .............. G03H 1/0402
                                                        359/30

OTHER PUBLICATIONS

Arsenault, Random Bias Holograms. Optics Communications. Dec. 1971;4(4):267-270.
Bashir et al., Optical Fiber Holography for remote and hostile environments. 2013 International Conference on Aerospace Science & Engineering (ICASE). Aug. 2013. 7 pages.
Ghoushchi et al., Effect of spatial coherence of LED sources on image resolution in holographic displays. ResearchGate. Feb. 2017. 9 pages.
Mottier et al., Relaxation of Coherence Requirements in Holography. Applied Optics. Feb. 1973;12(2):243-248.
Murphy et al., Holographic beam-shaping diffractive diffusers fabricated by using controlled laser speckle. Optics Express. Apr. 2, 2018;26(7):8916-8922.
Stroke et al., Resolution-Retrieving Source-Effect Compensation In Holography with Extended Sources. Applied Physics Letter. Sep. 15, 1965;7(6):178-179.

* cited by examiner

*Primary Examiner* — Matthew Mikels
(74) *Attorney, Agent, or Firm* — Wolf, Greenfield & Sacks, P.C.

(57) ABSTRACT

A holographic imaging system for capturing and displaying a high-resolution and polychromatic hologram, the holographic imaging system comprising: a plurality of monochromatic coherent light sources, configured to generate a plurality of monochromatic light input wavelengths; a polarization preserving diffuser configured to receive the plurality of monochromatic light input wavelengths at a first end of the polarization preserving diffuser, and further configured to provide a polychromatic output at a second end of the fiber; and a diffractive optical element configured to receive polychromatic light from the second end of the fiber.

20 Claims, 8 Drawing Sheets

100

102

114

104

106

118

108

116

120

110

122

112

CONTROLLING SPATIAL COHERENCE FOR HOLOGRAPHY

BACKGROUND

Holographic imaging systems capture three-dimensional images (e.g., holograms) of object. The three-dimensional images are formed by the interference of light which is encoded with the three-dimensional information of the object through diffraction of coherent light from the object. Furthermore, holographic imaging systems may display the three-dimensional image, after capture, by illumination of a holography medium with coherent light, such as to form a virtual image to be displayed for an observer.

SUMMARY

Some embodiments provide for a holographic imaging system comprising: a plurality of monochromatic coherent light sources, configured to generate a plurality of monochromatic light input wavelengths; a polarization preserving diffuser configured to receive the plurality of monochromatic light input wavelengths at a first end of the polarization preserving diffuser, and further configured to provide a polychromatic output as a second end of the fiber; and a diffractive optical element configured to receive polychromatic light from the second end of the fiber.

Some embodiments provide for a method of holographic imaging an object, the method comprising: generating a plurality of monochromatic light input wavelengths using a plurality of coherent light sources; modifying, using a polarization maintaining diffuser, a spatial profile of the plurality of monochromatic light input wavelengths to generate a polychromatic output; and providing the polychromatic output to a diffractive optical element for holography.

Some embodiments, provide for a holographic imaging system comprising: a monochromatic coherent light source, configured to generate a monochromatic input light; a multimode optical fiber configured to receive the monochromatic input light at a first end of the multimode optical fiber, and further configured to provide output light from a second end of the fiber; and a diffractive optical element configured to receive the output light from the second end of the fiber.

DETAILED DESCRIPTION

Figure 1A:
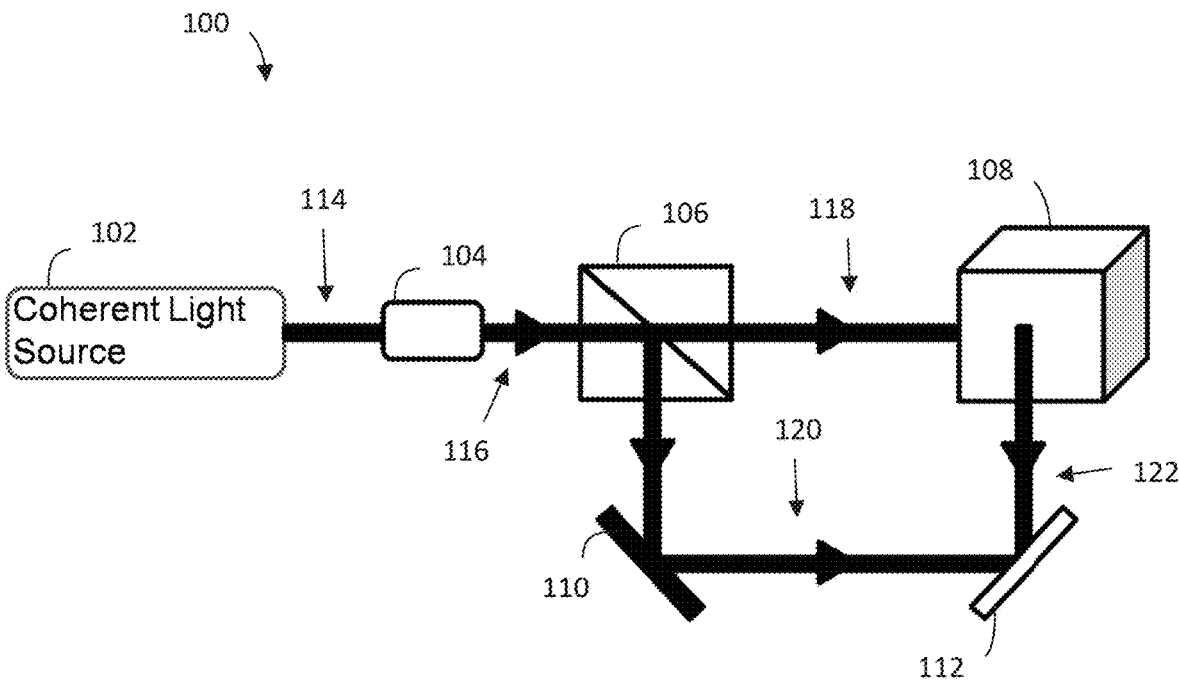
FIG. 1A illustrates an example of a holographic capture system, in accordance with some embodiments of the technology described herein.

The inventor has developed technology to facilitate holography imaging and playback. The technology includes hardware components to generate coherent light and to modify the characteristics of the coherent light to improve the performance of holographic capture and playback.

Holographic capture involves recording, in a holographic medium, a representation of an object or scene that includes parallax and depth of the object or scene. In holographic capture, the spatial extent and depth of an object or scene are captured by interfering light scattered off an object from an illumination beam with a reference beam. The scattering of light by the object modifies the phase of the illumination beam, forming an object beam which, upon combining with the reference beam, creates an interference pattern. The modification of the phase in the resulting object beam is indicative of the parallax and depth of the object or scene, which may be recorded in a recording medium.

Holographic playback involves illuminating the holographic medium, with an appropriate light source, such that a three-dimensional (3D) virtual image is produced for a holographic display. The quality of the captured hologram, and by extension a hologram display, depends on the characteristics of the coherent light source used during holographic capture and playback.

Conventional holography techniques rely on light with a high degree of spatial coherence to produce high quality (e.g., high chromatic uniformity and high resolution) interference patterns for hologram capture and playback. For example, spatially coherent light with a purely flat wavefront, such as with a collimated beam, or a spherical wavefront in applications which tolerate distortion and reduced parallax (such as a wavefront produced using spatial filters with no correcting optics) may be used to produce high quality holograms. To increase the resolution of the hologram, conventional holography relies on generating small light sources, such as a point source, to have a high degree of spatial coherence, which can improve the quality of the diffraction patterns. However, a challenge in producing high quality holograms is that high spatial coherence can result in the presence of speckle patterns in the resulting hologram. Speckle patters appear as a noise texture and result from the interference among different coherent wavefronts.

Aspects of the technology described herein may be used to modify the chromatic uniformity and/or coherence of a coherent light source to improve the quality of holographic capture and playback. The inventor has recognized and appreciated that, in contrast to conventional techniques that use reference beams with ultra-pure and completely even phase wavefronts (e.g., reference beams with high spatial coherence), high quality holograms can be produced with a scrambled reference wavefront (e.g., a reference wavefront with low spatial coherence of the reference wavefront) such that it produces some degree of random phase superimposed on to the originally flat or spherical wavefront. The inventor has further recognized and appreciated that, despite the scrambled reference wavefront, holograms with high diffraction efficiency and uniform color tones faithful to the original object or data signal can be readily recorded and played back. As described herein, the scrambled wavefront may be generated using a polarization maintaining diffuser. In some embodiments, the polarization maintaining diffuser may be a large core fiber. The output aperture of the large core fiber acts as the size of the light source producing an extended source (e.g., a light source larger than a point source). The extended source degrades the spatial coherence of the light by producing multiple interfering wavefronts.

The size of the extended source impacts the quality of the resulting image and should be balanced between speckle and hologram contrast, because with an extended source too small, you have unsightly speckle on the output. However, making the extended source aperture larger indeed reduces the speckle, but if the extended source is too large, the spatial coherence degrades to the point where the contrast fringes between the reference and object beams become too faint, decreasing the contrast in the resulting hologram, with the intermodulation noise from the extended source having a larger contribution to the recorded fringe pattern than the reference/object fringes.

In a traditional setup, to obtain clean and even combined light, you would either need to use one spatial filter for each laser wavelength used prior to combining the beams with dichroic filters. Alternatively, a traditional setup that uses a single spatial filter after beam combining requires one telescoping beam expander/reducer per wavelength to adjust the required beam widths to ensure the same focal point size at the pinhole. These setups are large, expensive, and can be time consuming for trained technicians to align.

Furthermore, in color holography, the varying spatial profiles of different colors of input light can provide chromatic non-uniformity (e.g., variations in the color intensity across the image) and/or color noise in the resulting hologram. Conventional color-holography uses point sources for each color so that the spatial profile of each color is the same, thereby reducing color artefacts in the resulting image. However, producing a point source involves focusing light into a pinhole, which dramatically reduces the efficiency of the light generation process as the pinhole blocks a portion of the light. Therefore, traditional techniques may result in low efficiency hologram production.

The inventor has recognized and appreciated that the use of a spatial filter for each laser wavelength or for telescoping using a beam expander/reducer is not required when a multimode optical fiber is used to serve as the means to mix the wavelengths via total internal reflection. Additionally, in other embodiments, either a holographic diffuser may be used, or other means of diffusing that preserves polarization may be used.

Accordingly, some embodiments provide for a holographic imaging system comprising: a plurality of monochromatic coherent light sources (e.g., lasers), configured to generate a plurality of monochromatic light input wavelengths; a polarization preserving diffuser (e.g., a multimodal optical fiber or a holographic diffuser) configured to receive the plurality of monochromatic light input wavelengths at a first end of the polarization preserving diffuser, and further configured to provide a polychromatic output as a second end of the fiber; and a diffractive optical element (e.g., a holographic recording media or a spatial light modulator) configured to receive polychromatic light from the second end of the fiber.

Accordingly, some embodiments provide for a method of holographic imaging an object, the method comprising: generating a plurality of monochromatic light input wavelengths using a plurality of coherent light sources (e.g., lasers); modifying, using a polarization maintaining diffuser (e.g., a multimodal optical fiber or a holographic diffuser), a spatial profile of the plurality of monochromatic light input wavelengths to generate a polychromatic output (e.g., mixing the different wavelengths of light to produce a uniform or substantially uniform color distribution across the spatial profile of the light); and providing the polychromatic output to a diffractive optical element for holography.

Some embodiments, provide for a holographic imaging system comprising: a monochromatic coherent light source, configured to generate a monochromatic input light; a multimode optical fiber configured to receive the monochromatic input light at a first end of the multimode optical fiber, and further configured to provide output light from a second end of the fiber; and a diffractive optical element configured to receive the output light from the second end of the fiber.

Holography records the interference of light waves at the plane of a holography medium. In holography, these two waves are described as the reference beam and the object beam. The reference beam may hit the holographic emulsion directly. The object beam, mutually coherent with the reference beam, hits the object and reflects an encoded wavefront that travels back to the holographic emulsion. The interference of the reference beam and the object beam at the plane of the holographic emulsion is what records a hologram.

FIG. 1A illustrates an example of a holographic capture system 100, in accordance with some embodiments of the technology described herein. Holographic capture system 100 includes coherent light source 102 configured to produce coherent light beam 114 and polarization maintaining diffuser 104 that receives coherent light beam 114. Polarization maintaining diffuser 104 modifies a characteristic of coherent light beam 114 to produce output beam 116. In some embodiments, output beam 116 is split by beam splitter 106 into an illumination beam 118 and a reference beam 120. The illumination beam 118 is scattered off object 108 to produce object beam 122 which is overlapped with reference beam 120 at the diffractive optical element 112. The interference pattern of reference beam 120 and object beam 122 is recorded by diffractive optical element 112. Additional optical may be included to direct one or more of the beams for alignment purposes, such as mirror 110 which is configured to reflect the reference beam 120 from the beam splitter to the diffractive optical element 112.

In some embodiments, the diffractive optical element is a holographic recording medium. For example, the holographic recording medium may be a high-resolution holographic medium, such as a high-resolution holographic emulsion.

In some embodiments, polarization maintaining diffuser 104 may be a multimodal optical fiber, as described herein. In some embodiments polarization maintaining diffuser 104 is a holographic diffuser, as described herein.

Figure 1B:
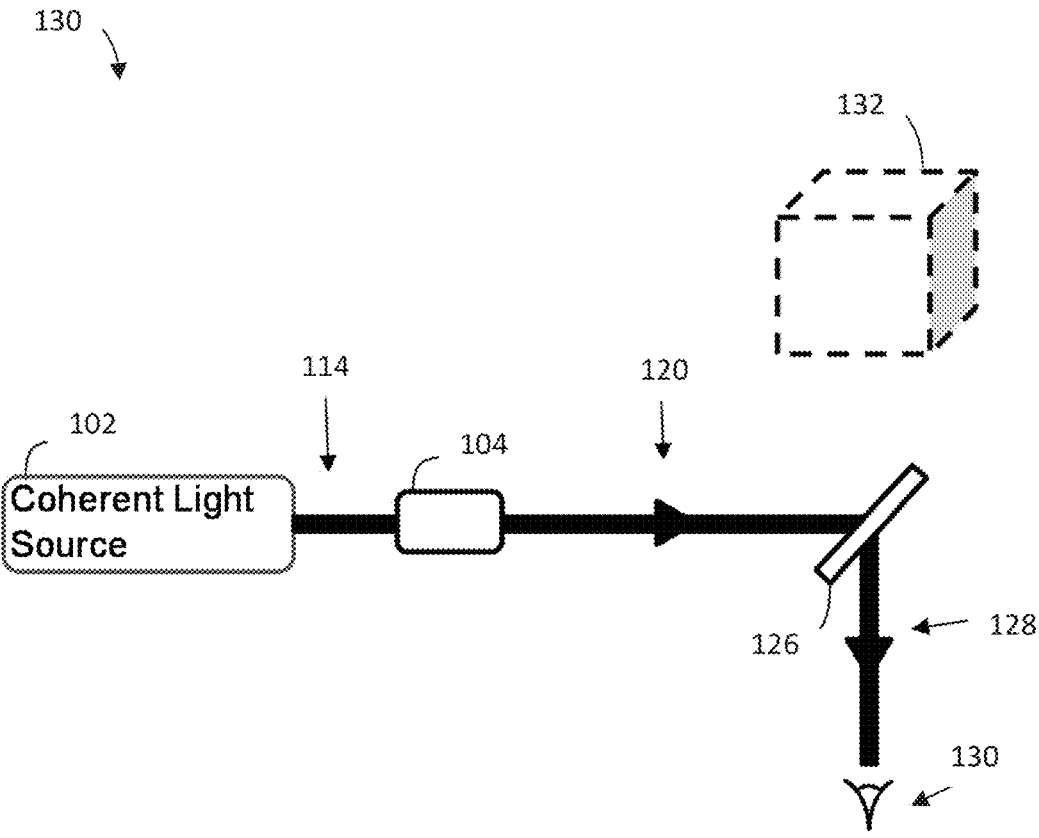
FIG. 1B is an example of a holographic playback system, in accordance with some embodiments of the technology described herein.

FIG. 1B is an example of a holographic playback system 130, in accordance with some embodiments of the technology described herein. Holographic playback system 130 may include the same light source, or a substantially similar light source, as used in the holographic capture system 100. As in FIG. 1A, coherent light source 102 is configured to produce coherent light beam 114. Polarization maintaining diffuser 104 modifies a characteristic of light beam 114 to produce reference beam 120. Reference beam 120 is incident on diffractive optical element 126 which includes a captured interference pattern. Diffraction of reference beam 120 by diffractive optical element 126 produces reconstructed object beam 128 which, when seen by an observer 130, displays virtual object 132.

Figure 2:
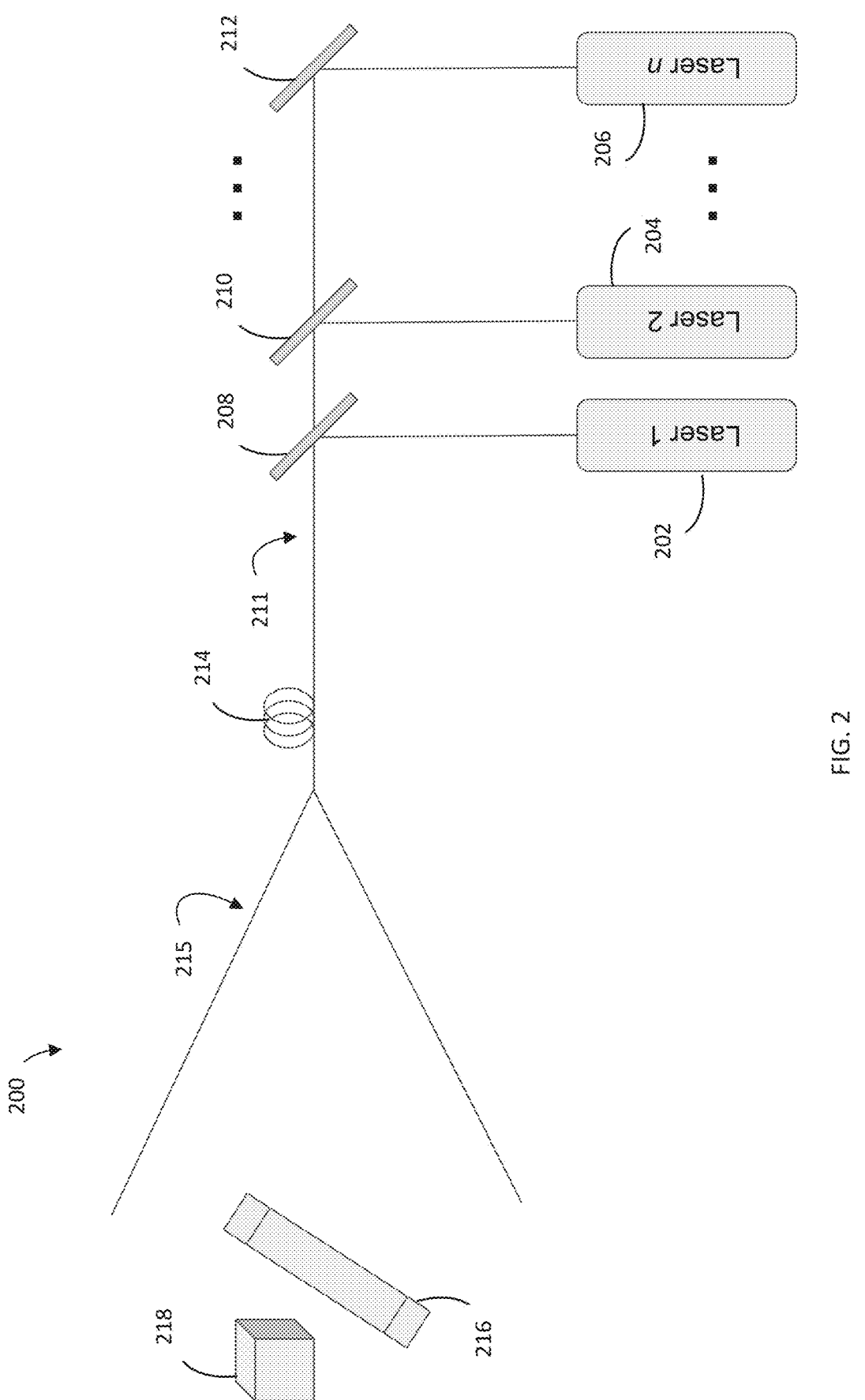
FIG. 2 illustrates an example of a holographic capture system with a multimodal optical fiber, in accordance with some embodiments of the technology described herein.

FIG. 2 illustrates an example of a holographic capture system 200 with a multimodal optical fiber, in accordance with some embodiments of the technology described herein. Holographic capture system 200 includes a plurality of coherent light sources 202, 204, and 206 each of which is configured to generate coherent light having a different center wavelength (e.g., monochromatic or approximately monochromatic light having a linewidth of less than one nanometer). The outputs of each coherent light source are combined into a shared beam path 211 using dichroic filters 208, 210, and 212. The shared beam path is directed into a multimodal optical fiber 214 to modify a characteristic of the coherent light in the shared beam path 211. The output from multimodal optical fiber 214 is polychromatic light 215 having a reduced spatial coherence. A reference portion of polychromatic light 215 is incident on diffractive optical element 216. Diffractive optical element 216 is configured to capture a hologram. An illumination portion of polychromatic light 215 is incident on object 218, which scatters an object portion, from the illumination portion of polychromatic light 215, towards the diffractive optical element.

The diameter of the multimodal optical fiber may be selected based on the size of the diffractive optical element. In some embodiments, the multimode optical fiber has a diameter between 3 mm and 5 mm and the diffractive optical element is configured to capture a hologram of up to 120 mm×200 mm in size. In some embodiments, the multimode optical fiber has a diameter greater than or equal to 5 mm and the diffractive optical element is configured to capture a hologram greater than 120 mm×200 mm in size.

The length of the multimodal optical fiber may be related to the coherence length of the coherent light sources. In some embodiments, the length of the multimodal optical fiber does not exceed half of the shortest coherence length, a quarter of the shortest coherence length, a tenth of the shortest coherence length, or a twentieth of the shortest coherence length of the plurality of coherence light sources.

In some embodiments, the diffractive optical element is a high-resolution holographic recording medium. The high-resolution holographic recording medium may be a silver halide recording medium, a photopolymer recording medium, or another recording medium material. For example, the high-resolution holographic recording medium may be an Ultimate Holography U04 with a 4 nm average grain size or an Ultimate holography U08C with an 8 nm average grain size. As another example, the high-resolution holographic recording medium may be a Bayfol® HX200 photopolymer film. In some embodiments, the diffractive optical element may be a holographic plate. For example, the high-resolution holographic recording medium may be an LitiHolo Hologram Film Plate. In other embodiments, the diffractive optical element may be other recording media, as aspects of the technology described herein are not limited in this respect.

Any number of coherent light sources may be used to generate a polychromatic hologram. The more distinct colors used to generate the hologram, the more complete the color reproduction may be during playback. In some embodiments, light source 202 is a first light source, light source 204 is a second light source, and light source 206 is an $n^{th}$ light source. As an example, light source 202 may be a first diode laser configured to generate red light (e.g., 620-750 nm), light source 204 may be a second diode laser configured to generate green light (e.g., 500-600 nm), and light source 206 may be a third laser diode configured to generate blue light (e.g., 450-499 nm).

In some embodiments, the plurality of coherent light sources may include between 2 and 5 coherent light sources, 2 and 7 light sources, or 2 and 10 light sources. For example, the plurality of coherent light sources may include 3, 4, or 5 coherent light sources. Although described herein as being a plurality of light sources, in some other embodiments configured to generate a monochromatic hologram, the system may include a single coherent light source. The single coherent light source may be any of the coherent light sources described herein in connection with the use of coherent light sources for polychromatic hologram generation and/or playback.

In some embodiments, the plurality of coherent light sources each have a temporal coherence length between 1-1000 meters, 5-1000 meters, 10-1000 meters, or 100-1000 meters. In some embodiments, the plurality of coherent light sources each have a temporal coherence length greater than 1000 meters. For example, the coherent light sources may be a single mode, continuous wave diode laser.

Although holographic capture systems shown in FIGS. 2, 4, 5, and 6 are illustrated as a single beam transmission configuration, any appropriate capture configuration may be used. In some embodiments, single beam reflection configurations may be used. In other embodiments, dual beam configurations may be used. Several configurations which may be used in any of the embodiments described herein are described below in connection with FIG. 3A-3C, although additional configurations may be possible as aspects of the technology described herein is not limited in this respect.

Figure 3A:
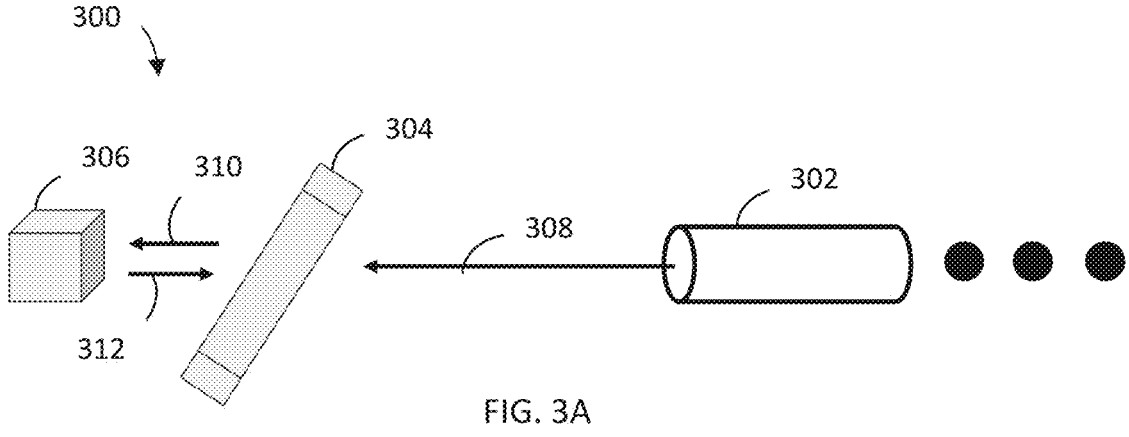
FIG. 3A illustrates an example of a single beam reflection holographic capture system, in accordance with some embodiments of the technology described herein.

FIG. 3A illustrates an example of a single beam reflection holographic capture system 300, in accordance with some embodiments of the technology described herein. The single beam reflection holographic system 300 receives coherent light 308 from the end of multimodal optical fiber 302. Diffractive optical element 304 receives the coherent light 308 at a front surface of the diffractive optical element which functions as a reference beam. A portion of coherent light 308 passes through diffractive optical element 304 which functions as an illumination beam 310 for object 306. Scattered light from the illumination beam by object 306 functions as an object beam 312 which interferers with the reference portion of coherent light 308 at the diffractive optical element 304. Accordingly, diffractive element 304 is configured to capture the interference pattern indicative of object 306.

Figure 3B:
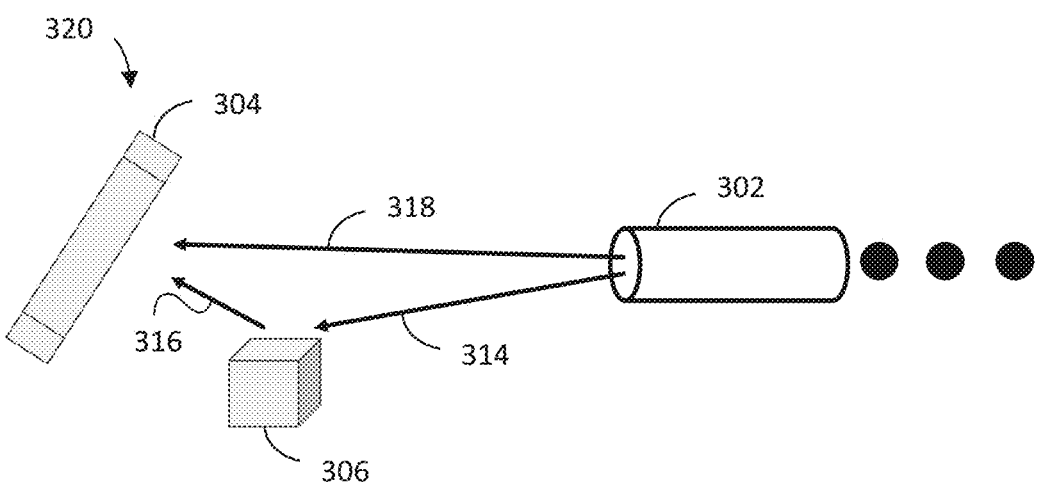
FIG. 3B illustrates an example of a single beam transmission holographic capture system, in accordance with some embodiments of the technology described herein.

FIG. 3B illustrates an example of a single beam transmission holographic capture system 320, in accordance with some embodiments of the technology described herein. The single beam transmission holographic system 320 receives coherent light from the end of multimodal optical fiber 302, similar to the configuration in FIG. 3A. However, unlike in FIG. 3A, the object 306 is positioned in front of diffractive optical element 304. Accordingly, a first portion 318 of the coherent light received from the end of multimodal optical fiber 302 is received directly by the diffractive optical element 304, such that the first portion 318 functions as a reference beam. Additionally, a second portion 314 is received by the object 306. Scattering of second portion 314 by the object 306 produces object beam 316. Object beam 316 interferes with the first portion 318 of coherent light to produce an interference pattern at the diffractive optical element 304. Accordingly, diffractive element 304 is configured to capture the interference pattern indicative of object 306.

Figure 3C:
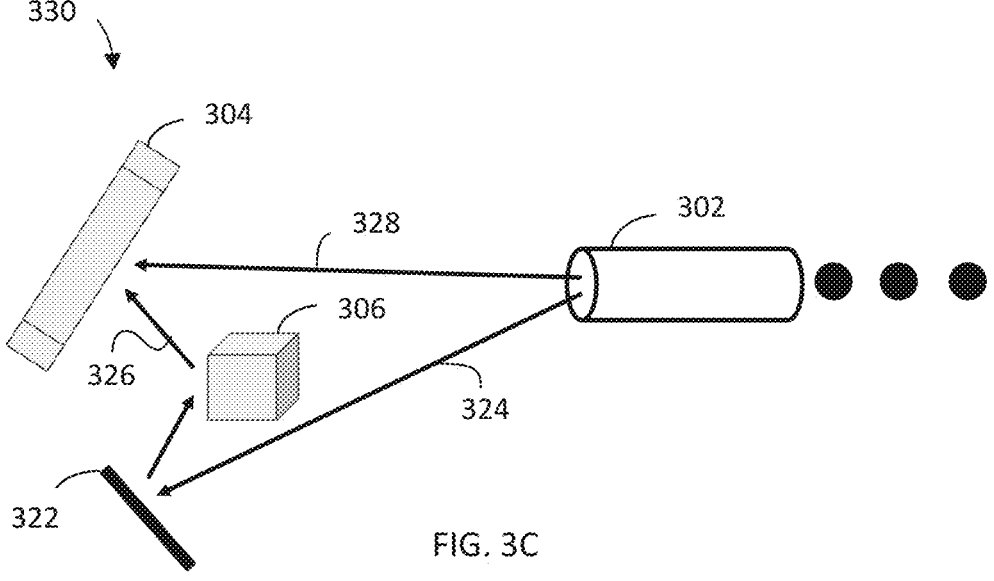
FIG. 3C illustrates an example of a modified single beam transmission holographic capture system, in accordance with some embodiments of the technology described herein.

FIG. 3C illustrates an example of a modified single beam transmission holographic capture system 330, in accordance with some embodiments of the technology described herein. The modified single beam transmission holographic capture system 330 receives coherent light from the end of multimodal optical fiber 302, similar to the configuration in FIG. 3B. However, to expand the illuminated portions of object 306, in addition to or as an alternative to directly receiving a portion of light from the end of the multimodal optical fiber, a mirror 322 is configured to reflect portions of illumination light 324 to object 306. As with the configurations in FIGS. 3A and 3B, scattering of the illumination light by object 306 produces object beam 326 which interferes with the reference portion of light 328 at the diffractive optical element 304. Accordingly, diffractive element 304 is configured to capture the interference pattern indicative of object 306.

Relative to holographic capture system 200, it is possible for the number of discrete optical components to be reduced, and the system simplified, by using a 3-to-1 (or N-to-1) multimode fiber combiner with respective dichroic coating deposited onto the face of each input fiber.

Figure 4:
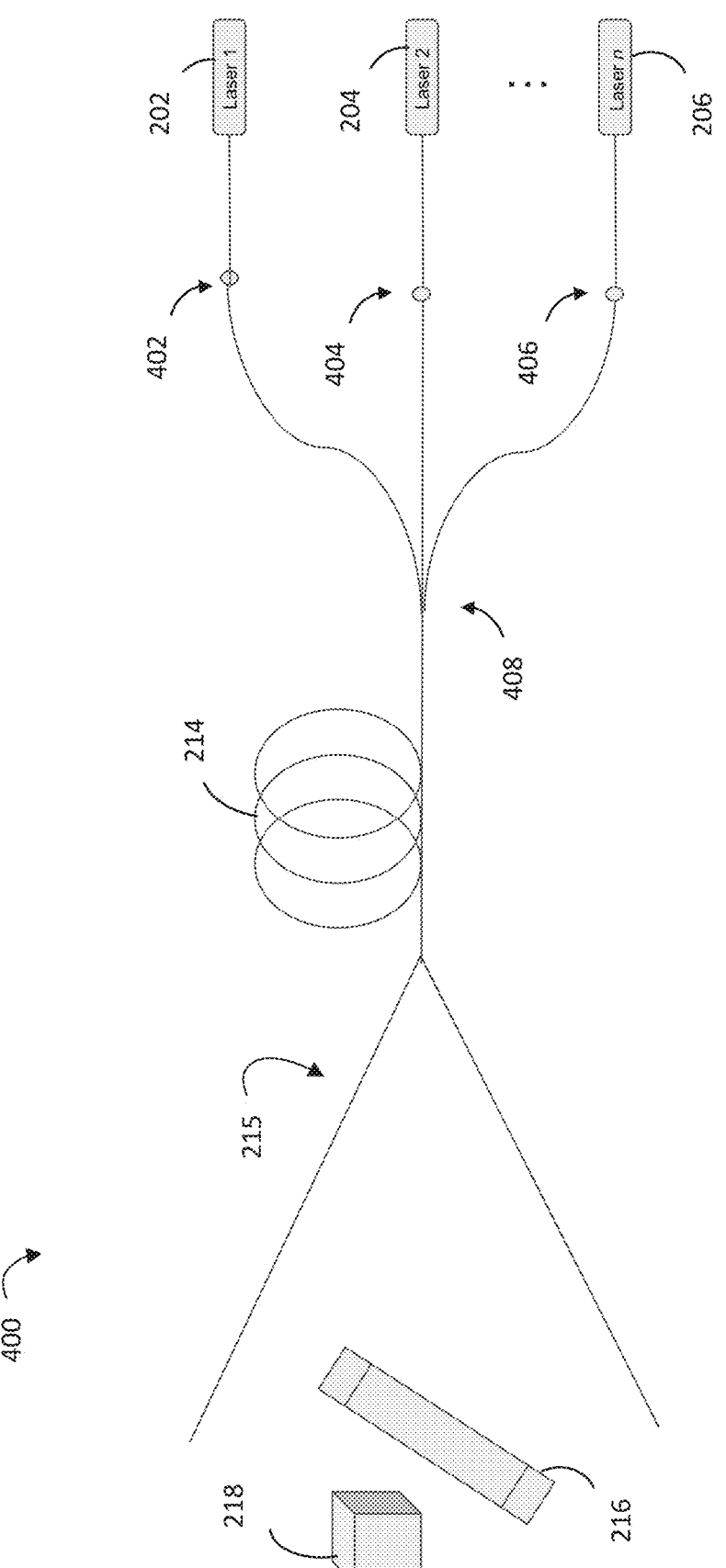
FIG. 4 illustrates an example of a holographic capture system with a split input multimodal optical fiber, in accordance with some embodiments of the technology described herein.

FIG. 4 illustrates an example of a holographic capture system 400 with a split input multimodal optical fiber, in accordance with some embodiments of the technology described herein. The lasers 202, 204, and 206, diffractive optical element 216, and object 218 of holographic system 400 may be configured in the same way as the corresponding components of holographic system 200. Rather than using dichroic filters, as in holographic system 200, to combine the outputs of each laser into a shared beam path prior to inputting into the multimodal optical fiber 214, holographic system 400 includes split fiber inputs to multimode optical fiber 214. The number of split fiber inputs may correspond to the number of coherent light sources. Holographic capture system 400 includes split fiber inputs 402, 404, and 406 corresponding to coherent light source 202, 204, and 206—respectively. The split fiber inputs may be combined with fiber coupler 408 such that coherent light received at each split fiber input is coupled into multimodal fiber 214. The output from multimodal optical fiber 214 is polychromatic light 215 having a reduced spatial coherence—as described above.

As described herein, the holographic capture system may include any number of coherent light sources. Accordingly, holographic capture system 400 may include a corresponding number of split fiber inputs. For example, holographic capture system 400 may include 3 coherent light sources, a first light source configured to generate red light, a second light source configured to generate green light, and a third light source configured to generate blue light—as described herein. Accordingly, holographic capture system 400 may include 3 split fiber inputs. Each split fiber input may each be a single mode optical fiber in some embodiments or may each be a multimode fiber in other embodiments.

In some embodiments, the ends of split fiber inputs 402, 404, and 406 each include a dichroic coated fiber face. For example, the dichroic coated fiber face may be configured to prevent back reflections from inside the fiber being coupled out towards the coherent light sources. As another example, the dichroic coated fiber face may be configured to improve coupling efficiency of the light from the coherent light sources into the respective split fiber faces.

The output facet of multimodal optical fiber 214 may be configured to further reduce spatial coherence, in accordance with some embodiments. For example, the output facet of the multimodal optical fiber 214 may be unpolished. As another example, the output facet of the multimodal optical fiber 214 may be roughened to have a particular surface roughness.

The output facet of multimodal optical fiber 214 may be configured for output coupling efficiency, in accordance with some embodiments. In some embodiments, the output facet of the multimodal optical fiber is a polished output facet. In some embodiments, the output facet of the multimodal optical fiber is cut at a specific coupling angle.

As an alternative to using respective optical fibers for each coherent light source, some embodiments may direct light directly into the multimodal optical fiber or holographic diffuser within the maximum numerical aperture supported by the fiber or diffuser.

Figure 5:
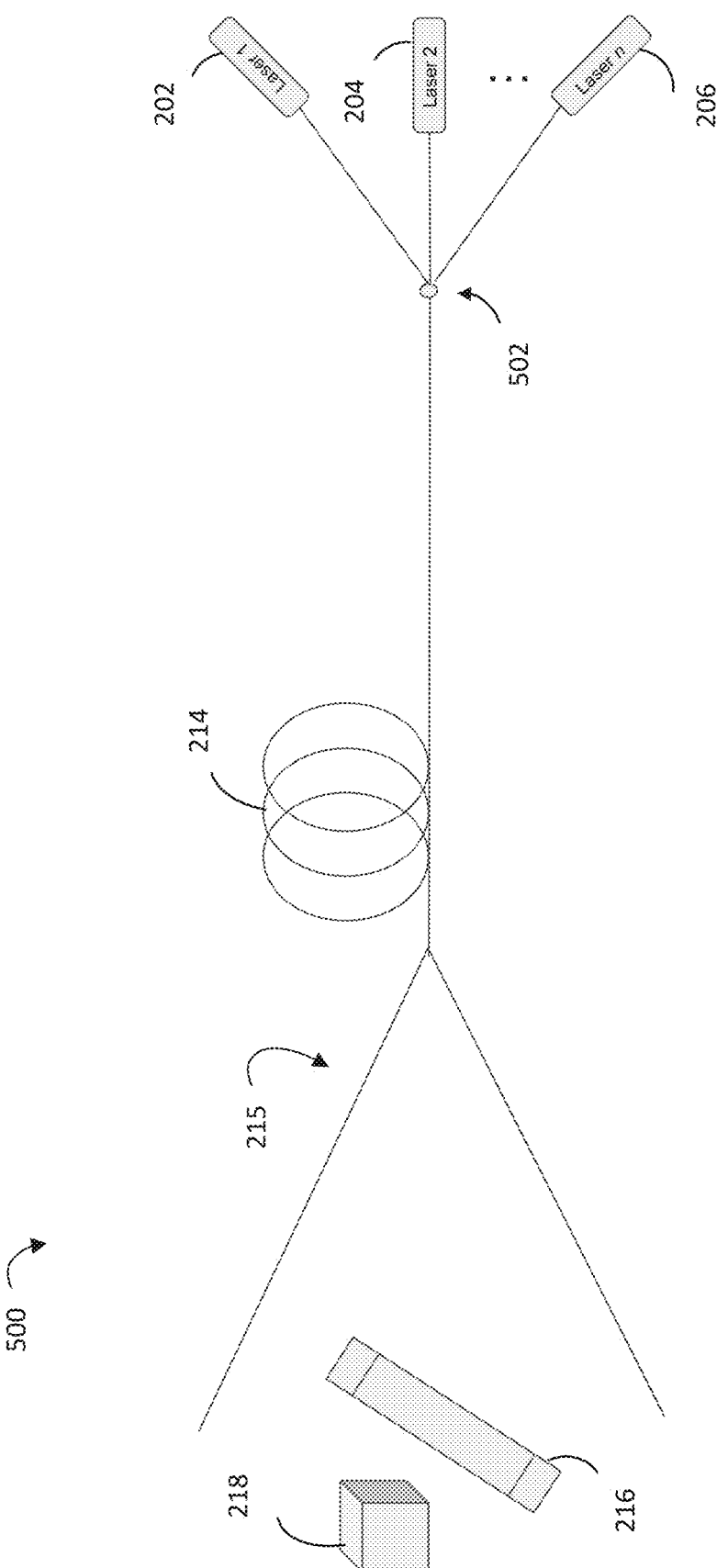
FIG. 5 illustrates an example of a holographic capture system with a shared input multimodal optical fiber, in accordance with some embodiments of the technology described herein.

FIG. 5 illustrates an example of a holographic capture system 500 with a shared input multimodal optical fiber, in accordance with some embodiments of the technology described herein. The lasers 202, 204, and 206, diffractive optical element 216, and object 218 of holographic system 500 may be configured in the same way as the corresponding components of holographic system 200. Rather than using dichroic filters, as in holographic system 200, to combine the outputs of each laser into a shared beam path prior to inputting into the multimodal optical fiber 214, holographic capture system 500 directly couples the respective outputs of the coherent light sources into the input end 502 of multimodal optical fiber 214.

Figure 6:
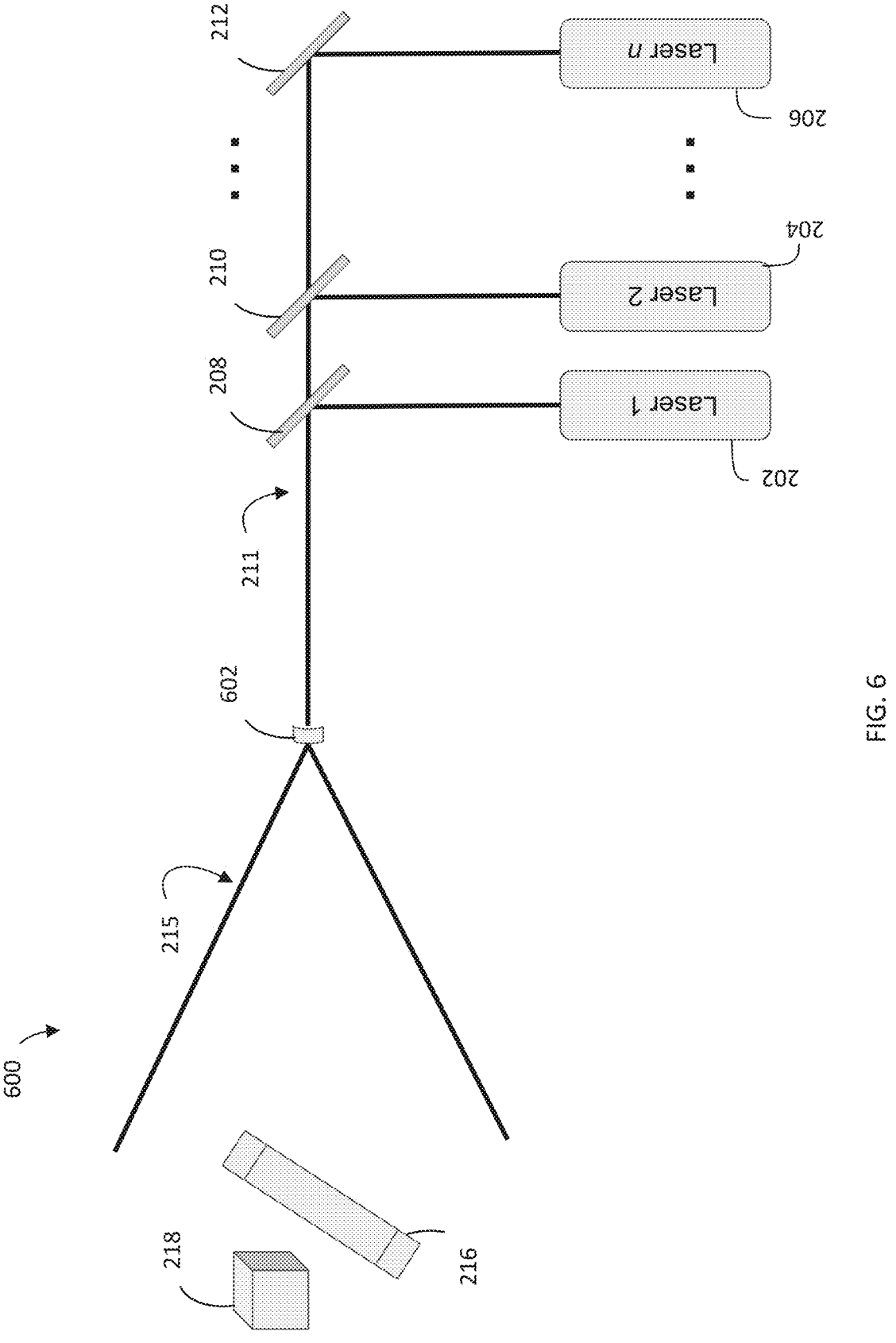
FIG. 6 illustrates an example of a holographic capture system with a holographic diffuser, in accordance with some embodiments of the technology described herein.

FIG. 6 illustrates an example of a holographic capture system 600 with a holographic diffuser, in accordance with some embodiments of the technology described herein. The lasers 202, 204, and 206, shared beam path 211, diffractive optical element 216, and object 218 of holographic system 600 may be configured in the same way as the corresponding components of holographic system 200. Rather than use a multimodal optical fiber, holographic capture system 600 uses a holographic diffuser 602 to modify characteristics of light in the shared beam path 211 to produce polychromatic output 215.

Figure 7:
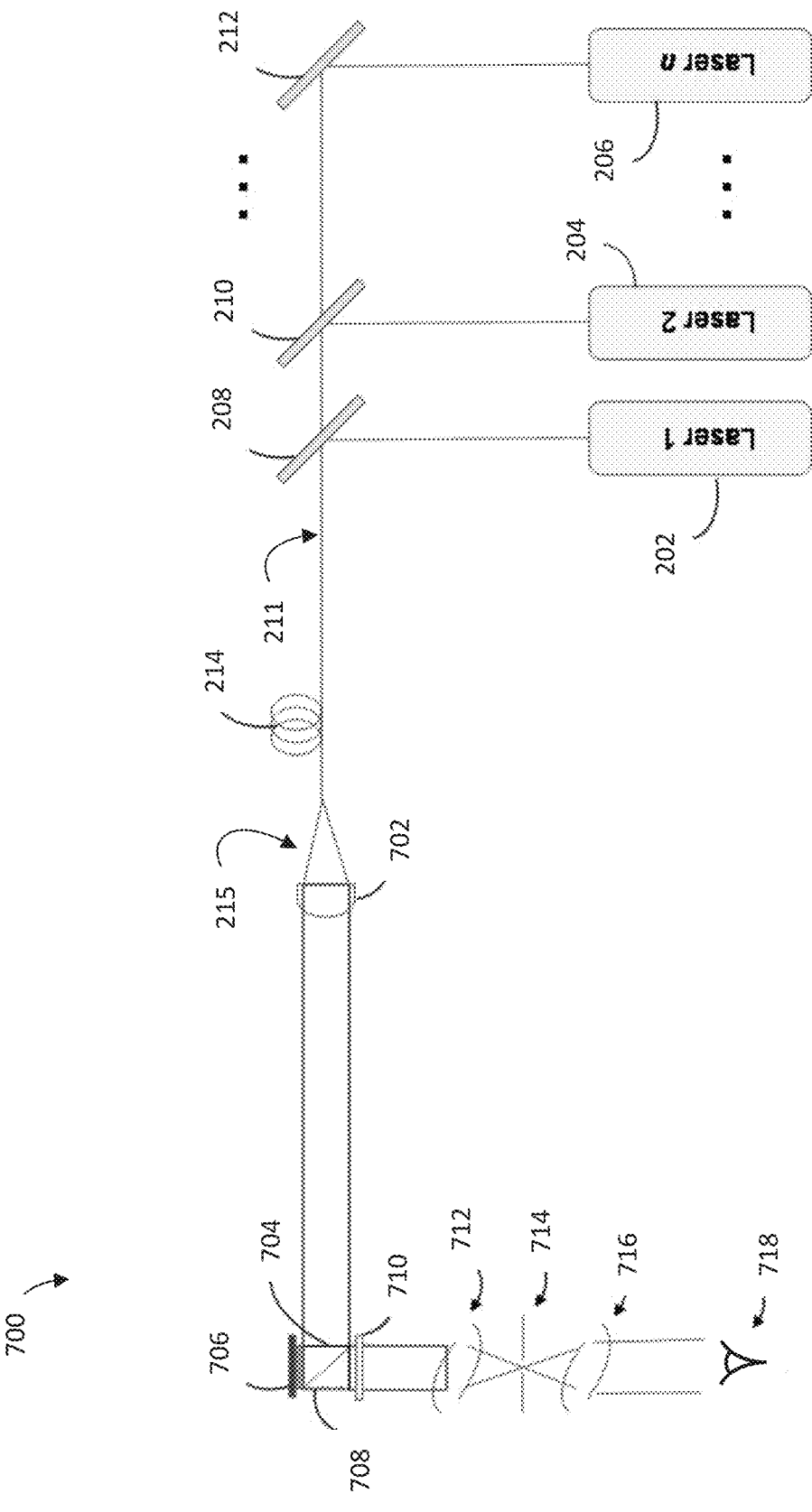
FIG. 7 illustrates an example of a holographic playback system with a multimodal optical fiber, in accordance with some embodiments of the technology described herein.

FIG. 7 illustrates an example of a holographic playback system 700 with a multimodal optical fiber, in accordance with some embodiments of the technology described herein. The lasers 202, 204, and 206, shared beam path 211, multimodal optical fiber 214, and polychromatic light 215 of holographic playback system 700 may be configured in the same way as the corresponding components of holographic capture system 200. The polychromatic light 215 output from multimodal optical fiber 214 is collimated by lens 702 and directed to beamsplitter 704. In some embodiments, beamsplitter 704 is configured with a mirrored surface 708. The beamsplitter 704 is further configured to direct a first portion of collimated light towards diffractive optical element 706 and to direct a second portion of collimated light towards mirrored surface 708. Light reflected with the diffractive optical element 706 and light reflected from the mirrored surface 708 are combined and directed towards polarizer 710. The diffractive optical element 706 may be configured to diffract light such that the light is encoded with a diffraction pattern indicative of a virtual image. A spatial filter including focusing lens 712, pinhole 714, and collimating lens 716 are configured to direct light, corresponding to a virtual image, to user 718.

In some embodiments, diffractive optical element 706 may be a recording medium on which an interference pattern corresponding to the object is captured. Accordingly, the captured interference pattern on the recording medium modulates incident polychromatic light from the multimodal optical fiber to generate modulated light corresponding to a hologram of an object. In some embodiments, the recording medium may receive monochromatic light. In some embodiments, the recording medium may be a high-resolution holographic recording medium, as described herein.

In some embodiments, diffractive optical element 706 may be a spatial light modulator. Accordingly, the spatial light modulator may be configured to modulate polychromatic light from the multimodal optical fiber to generate modulated light corresponding to a hologram of an object. In some embodiments, the spatial light modulator may receive monochromatic light from the multimodal optical fiber and may modulate the monochromatic light corresponding to a monochromatic hologram, or a single-color channel, of a hologram.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

The phrase "and/or," as used herein in the specification and in the claims, should be understood to mean "either or both," of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The indefinite articles "a" and "an," as used herein in the specification and in the claims, unless clearly indicated to the contrary, should be understood to mean "at least one."

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "substantially," "approximately," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

The invention claimed is:

1. A holographic imaging system comprising:
   a plurality of monochromatic coherent light sources, configured to generate a plurality of monochromatic light input wavelengths;
   a polarization preserving diffuser configured to receive the plurality of monochromatic light input wavelengths at a first end of the polarization preserving diffuser, and further configured to provide a polychromatic output at a second end of the polarization preserving diffuser; and
   a diffractive optical element configured to receive polychromatic light from the second end of the polarization preserving diffuser.

2. The holographic imaging system of claim 1, wherein the diffractive optical element is a holographic film for capturing a hologram of an object.

3. The holographic imaging system of claim 2, wherein the holographic film is a silver halide recording medium.

4. The holographic imaging system of claim 2, wherein the holographic film is a photopolymer recording medium.

5. The holographic imaging system of claim 1 wherein the diffractive optical element is a spatial light modulator configured to modulate the polychromatic light from the second end of the polarization preserving diffuser to generate modulated polychromatic light corresponding to a hologram of an object.

6. The holographic imaging system of claim 1, wherein the plurality of monochromatic coherent light sources comprises a first diode laser configured to generate red light, a second diode laser configured to generate green light, and a third diode laser configured to generate blue light.

7. The holographic imaging system of claim 1, wherein coherent light sources of the plurality of monochromatic coherent light sources each have a temporal coherence length between 1 m and 1000 m.

8. The holographic imaging system of claim 1, wherein the polarization preserving diffuser comprises a multimode optical fiber.

9. The holographic imaging system of claim 8, wherein the multimode optical fiber has a diameter between 3 mm and 5 mm and the diffractive optical element is configured to capture a hologram of up to 120 mm×200 mm in size.

10. The holographic imaging system of claim 8, wherein the multimode optical fiber has a diameter greater than or equal to 5 mm and the diffractive optical element is configured to capture a hologram greater than 120 mm×200 mm in size.

11. The holographic imaging system of claim 8, wherein a first end of the multimode optical fiber comprises a split into three fiber input ends, wherein each of the three fiber input ends is configured to receive monochromatic coherent light of a different wavelength, and wherein a second end of the multimode optical fiber comprises an unpolished output facet.

12. The holographic imaging system of claim 11, wherein each of the three fiber input ends comprise a respective dichroic filter.

13. The holographic imaging system of claim 8, wherein a length of the multimode optical fiber does not exceed half of a shortest coherence length of the plurality of monochromatic coherent light sources.

14. The holographic imaging system of claim 1, wherein the polarization preserving diffuser is a holographic diffuser.

15. The holographic imaging system of claim 1, wherein the diffractive optical element and the polychromatic output are each configured to capture a hologram of an object having a speckle size of less than or equal to 50 microns.

16. The holographic imaging system of claim 15, wherein the diffractive optical element and the polychromatic output are each configured to capture a hologram of an object having a speckle size of less than or equal to 20 microns.

17. A method of holographic imaging an object, the method comprising:

generating a plurality of monochromatic light input wavelengths using a plurality of coherent light sources;

modifying, using a polarization maintaining diffuser, a spatial profile of the plurality of monochromatic light input wavelengths to generate a polychromatic output; and providing the polychromatic output to a diffractive optical element for holography.

18. The method of claim 17, wherein the polarization maintaining diffuser used to modify the spatial profile of the plurality of monochromatic light input wavelengths to generate a polychromatic output comprises using a multimode optical fiber and wherein a length of the multimode optical fiber does not exceed half of a shortest coherence length of the plurality of monochromatic coherent light sources.

19. A holographic imaging system comprising:

a monochromatic coherent light source, configured to generate a monochromatic input light;

a multimode optical fiber configured to receive the monochromatic input light at a first end of the multimode optical fiber, and further configured to provide output light from a second end of the fiber; and a diffractive optical element configured to receive the output light from the second end of the fiber.

20. The holographic imaging system of claim 19, wherein a length of the multimode optical fiber does not exceed half of a shortest coherence length of the monochromatic coherent light source.

* * * * *